US012030122B2

(12) United States Patent
Nakamura et al.

(10) Patent No.: US 12,030,122 B2
(45) Date of Patent: Jul. 9, 2024

(54) METHOD OF MANUFACTURING SOFT MAGNETIC DUST CORE

(71) Applicants: JFE STEEL CORPORATION, Tokyo (JP); TOKIN CORPORATION, Sendai (JP); National Institute of Advanced Industrial Science and Technology, Tokyo (JP)

(72) Inventors: Naomichi Nakamura, Tokyo (JP); Makoto Nakaseko, Tokyo (JP); Takuya Takashita, Tokyo (JP); Mineo Muraki, Tokyo (JP); Hoshiaki Terao, Niigata (JP); Raita Wada, Niigata (JP); Akiri Urata, Sendai (JP); Yu Kanamori, Sendai (JP); Makoto Yamaki, Sendai (JP); Koichi Okamoto, Sendai (JP); Toshinori Tsuda, Sendai (JP); Shoichi Sato, Sendai (JP); Kimihiro Ozaki, Nagoya (JP)

(73) Assignees: JFE STEEL CORPORATION, Tokyo (JP); TOKIN CORPORATION, Miyagi (JP); National Institute of Advanced Industrial Science and Technology, Tokyo (JP)

( * ) Notice: Subject to any disclaimer, the term of this patent is extended or adjusted under 35 U.S.C. 154(b) by 651 days.

(21) Appl. No.: 17/075,693

(22) Filed: Oct. 21, 2020

(65) Prior Publication Data

US 2021/0031268 A1 Feb. 4, 2021

Related U.S. Application Data

(62) Division of application No. 15/737,429, filed as application No. PCT/JP2016/003512 on Jul. 28, 2016, now abandoned.

(30) Foreign Application Priority Data

Jul. 31, 2015 (JP) ................................ 2015-152804

(51) Int. Cl.
*B22F 3/14* (2006.01)
*B22F 1/00* (2022.01)
(Continued)

(52) U.S. Cl.
CPC ................. *B22F 3/14* (2013.01); *B22F 1/00* (2013.01); *B22F 1/08* (2022.01); *B22F 1/102* (2022.01);
(Continued)

(58) Field of Classification Search
None
See application file for complete search history.

(56) References Cited

U.S. PATENT DOCUMENTS

| | | | | |
|---|---|---|---|---|
| 5,509,975 | A | 4/1996 | Kojima et al. | |
| 2005/0254989 | A1* | 11/2005 | Fujiwara | H01F 1/15308 420/8 |

(Continued)

FOREIGN PATENT DOCUMENTS

| | | | |
|---|---|---|---|
| EP | 0302355 | A1 | 2/1989 |
| EP | 0302355 | B1 | 11/1993 |

(Continued)

OTHER PUBLICATIONS

Machine translation of JP 2014-075528A. (Year: 2014).*
(Continued)

*Primary Examiner* — Xiaowei Su
(74) *Attorney, Agent, or Firm* — KENJA IP LAW PC

(57) ABSTRACT

Provided is a method of manufacturing a soft magnetic dust core. The method includes: preparing coated powder including amorphous powder made of an Fe-B-Si-P-C-Cu-based
(Continued)

alloy, an Fe-B-P-C-Cu-based alloy, an Fe-B-Si-P-Cu-based alloy, or an Fe-B-P-Cu-based alloy, with a first initial crystallization temperature $T_{x1}$ and a second initial crystallization temperature $T_{x2}$; and a coating formed on a surface of particles of the amorphous powder; applying a compacting pressure to the coated powder or a mixture of the coated powder and the amorphous powder at a temperature equal to or lower than $T_{x1}-100$ K; and heating to a maximum end-point temperature equal to or higher than $T_{x1}-50$ K and lower than $T_{x2}$ with the compacting pressure being applied.

18 Claims, 1 Drawing Sheet

(51) Int. Cl.

| | |
|---|---|
| ***B22F 1/02*** | (2006.01) |
| ***B22F 1/08*** | (2022.01) |
| ***B22F 1/102*** | (2022.01) |
| ***B22F 1/16*** | (2022.01) |
| ***B22F 3/00*** | (2021.01) |
| ***B22F 3/02*** | (2006.01) |
| ***B22F 3/03*** | (2006.01) |
| ***C22C 33/02*** | (2006.01) |
| ***C22C 38/00*** | (2006.01) |
| ***C22C 38/02*** | (2006.01) |
| ***C22C 38/16*** | (2006.01) |
| ***C22C 45/02*** | (2006.01) |
| ***H01F 1/153*** | (2006.01) |
| ***H01F 3/08*** | (2006.01) |
| ***H01F 41/02*** | (2006.01) |
| *H01F 27/255* | (2006.01) |

(52) U.S. Cl.

CPC .................. *B22F 1/16* (2022.01); *B22F 3/00* (2013.01); *B22F 3/02* (2013.01); *B22F 3/03* (2013.01); *C22C 33/02* (2013.01); *C22C 38/00* (2013.01); *C22C 38/002* (2013.01); *C22C 38/02* (2013.01); *C22C 38/16* (2013.01); *C22C 45/02* (2013.01); *H01F 1/15308* (2013.01); *H01F 1/15325* (2013.01); *H01F 1/15333* (2013.01); *H01F 1/15375* (2013.01); *H01F 3/08* (2013.01); *H01F 41/0246* (2013.01); *B22F 2301/35* (2013.01); *B22F 2304/10* (2013.01); *C22C 2200/02* (2013.01); *C22C 2200/04* (2013.01); *C22C 2202/02* (2013.01); *H01F 27/255* (2013.01)

(56) References Cited

U.S. PATENT DOCUMENTS

| | | | |
|---|---|---|---|
| 2006/0254386 | A1 | 11/2006 | Inoue et al. |
| 2009/0116990 | A1 | 5/2009 | Unoki et al. |
| 2014/0138569 | A1 | 5/2014 | Otsuka et al. |
| 2015/0115766 | A1 | 4/2015 | Taguchi et al. |

FOREIGN PATENT DOCUMENTS

| | | | |
|---|---|---|---|
| EP | 1593749 | A1 | 11/2005 |
| EP | 2128292 | A1 | 12/2009 |
| JP | H07145442 | A | 6/1995 |
| JP | H08337839 | A | 12/1996 |
| JP | H11256202 | A | 9/1999 |
| JP | 2004204296 | A | 7/2004 |
| JP | 2004349585 | A | 12/2004 |
| JP | 2009174034 | A | 8/2009 |
| JP | 2010118486 | A | 5/2010 |
| JP | 4752641 | B2 | 8/2011 |
| JP | 2012136770 | A | 7/2012 |
| JP | 2014075528 | A | 4/2014 |
| JP | 2014103265 | A | 6/2014 |
| JP | 5537534 | B2 | 7/2014 |
| JP | 2015084353 | A | 4/2015 |

OTHER PUBLICATIONS

Zhang, IEEE Transactions on Magnetics. vol. 50, No. 11. (Year: 2014).*

Akira Kawasaki et al., “Powder Metallurgical Consolidation of Metallic Glass Powders of Fe-Based System”, Journal of High Temperature Society, Mar. 2010, pp. 59-65, vol. 36, No. 2.

Aug. 20, 2018, Office Action issued by the Canadian Intellectual Property Office in the corresponding Canadian Patent Application No. 2,990,362.

Feb. 8, 2019, Office Action issued by the Korean Intellectual Property Office in the corresponding Korean Patent Application No. 10-2018-7005253 with English language concise statement of relevance.

Jan. 17, 2020, Office Action issued by the Korean Intellectual Property Office in the corresponding Korean Patent Application No. 10-2018-7005253 with English language concise statement of relevance.

Jun. 28, 2019, Office Action issued by the Korean Intellectual Property Office in the corresponding Korean Patent Application No. 10-2018-7005253 with English language Concise Statement of Relevance.

Jun. 6, 2018, Extended European Search Report issued by the European Patent Office in the corresponding European Patent Application No. 16832510.8.

Mar. 27, 2018, Notification of Reasons for Refusal issued by the Japan Patent Office in the corresponding Japanese Patent Application No. 2015-152804 with English language Concise Statement of Relevance.

May 21, 2019, Official Decision of Refusal issued by the Japan Patent Office in the corresponding Japanese Patent Application No. 2015-152804 with English language concise statement of relevance.

May 8, 2019, Office Action issued by the China National Intellectual Property Administration in the corresponding Chinese Patent Application No. 201680044515.9 with English language search report.

Nov. 13, 2018, Notification of Reasons for Refusal issued by the Japan Patent Office in the corresponding Japanese Patent Application No. 2015-152804 with English language concise statement of relevance.

Oct. 4, 2016, International Search Report issued in the International Patent Application No. PCT/JP2016/003512.

Oct. 4, 2017, PCT Third Party Observation issued in the International Patent Application No. PCT/JP2016/003512.

Yoshihito Kawamura et al., “Consolidation of Amorphous Fe—Zr—B Powders by Hot-pressing Method”, Journal of the Japan Society of Powder and Powder Metallurgy, Jan. 1995, pp. 40-46, vol. 42, No. 1.

* cited by examiner

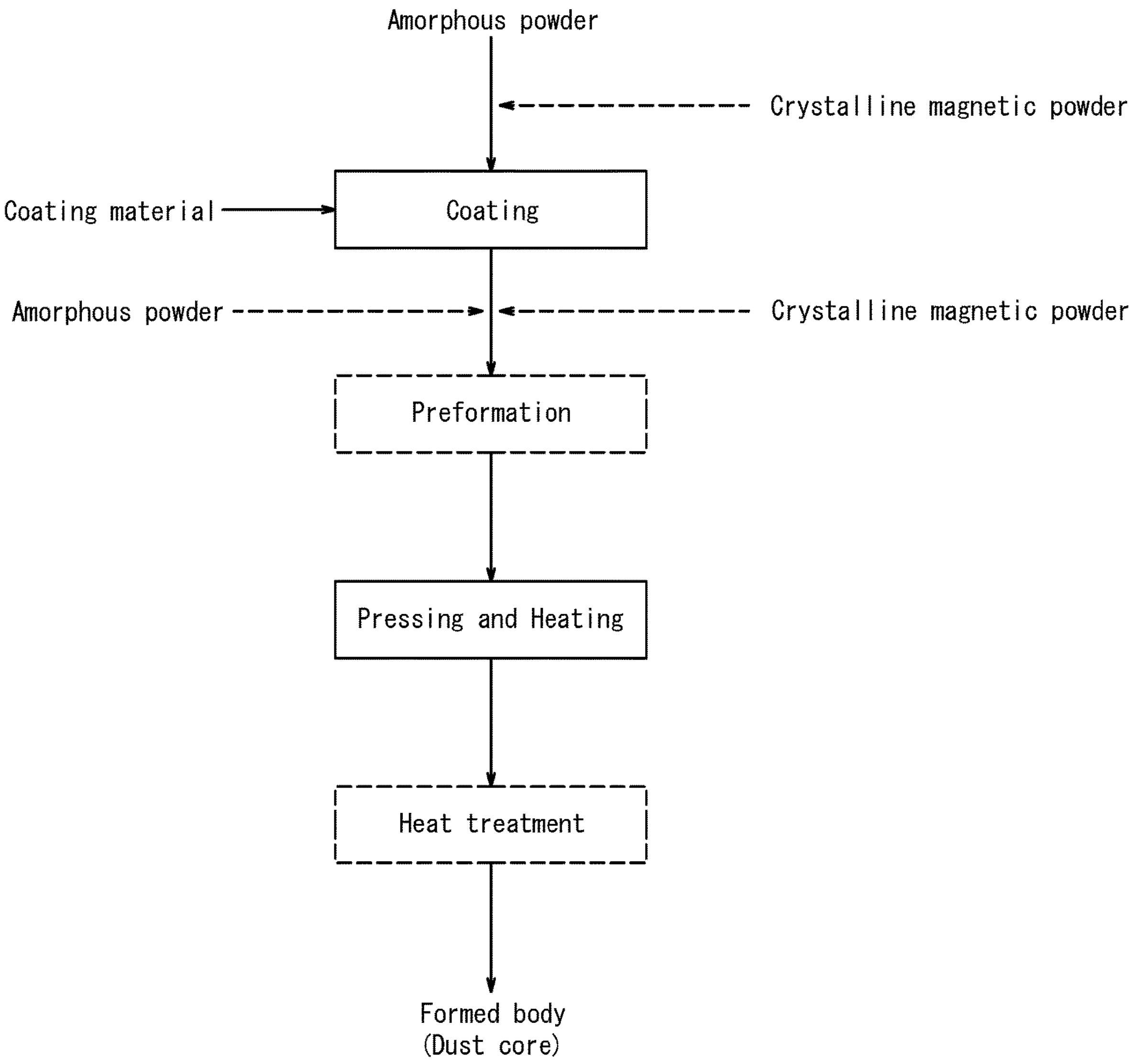
Amorphous powder
Crystalline magnetic powder
Coating material
Coating
Amorphous powder
Crystalline magnetic powder
Preformation
Pressing and Heating
Heat treatment
Formed body
(Dust core)

METHOD OF MANUFACTURING SOFT MAGNETIC DUST CORE

CROSS-REFERENCE TO RELATED APPLICATION

This application is a divisional application of U.S. application Ser. No. 15/737,429 filed Dec. 18, 2017, which is a National Stage Application of PCT/JP2016/003512 filed Jul. 28, 2016, which claims priority based on Japanese Patent Application No. 2015-152804 filed Jul. 31, 2015. The disclosures of the prior applications are hereby incorporated by reference herein in their entirety.

TECHNICAL FIELD

This disclosure relates to a method of manufacturing a soft magnetic dust core, and in particular, relates to a method of manufacturing an iron-based soft magnetic dust core having a nanocrystalline structure. Further, this disclosure relates to a soft magnetic dust core manufactured by the above-mentioned manufacturing method.

BACKGROUND

A dust core is a magnetic core manufactured by green compacting magnetic powder. An insulation coating is typically applied to the surface of the particles of the material magnetic powder, and a binder is added to the powder as necessary to improve mechanical strength. Because of their structure, dust cores have features including reduced eddy current losses and isotropic magnetic properties, compared with laminated magnetic cores obtained by stacking, for example, electrical steel sheets. Accordingly, dust cores are being developed in the field of high-frequency technology.

Of dust cores, dust cores made using crystalline powder as a material have already been in practical use in a variety of applications such as choke coils. Further, in parallel with the dust cores using a crystalline material, nanocrystalline dust cores using a nanocrystalline soft magnetic material are also being developed.

A nanocrystalline soft magnetic material is a soft magnetic material containing fine crystals. For example, an iron-based nanocrystalline material, which is a typical nanocrystalline soft magnetic material, can be obtained by subjecting an alloy to heat treatment, the alloy including, as the main phase, an amorphous structure having a structure that can exhibit a nanocrystalline structure. The heat treatment is performed at a temperature equal to or higher than the crystallization temperature determined in accordance with the composition of the alloy. Performing the heat treatment at an excessively high temperature would cause for example coarsening of crystal grains and precipitation of a non-magnetic phase. Accordingly, studies have been made to manufacture iron-based nanocrystalline dust cores having favorable properties.

For example, JP 2004-349585 A (PTL 1) and JP 2014-103265 A (PTL 2) disclose techniques of manufacturing a nanocrystalline dust core by mixing powder made of for example an Fe-Si-B-Nb-Cu-Cr-based amorphous alloy with a binder and pressing the mixed powder; and then performing heat treatment to harden the binder, thereby precipitating the nanocrystalline phase during the heat treatment.

Further, JP 5537534 B2 (PTL 3) discloses a method of manufacturing a soft magnetic dust core by performing heat treatment on Fe-B-Si-P-C-Cu-based amorphous powder and nanocrystallization is performed on the powder followed by pressing.

However, amorphous particles and the nanocrystallized particles having been subjected to heat treatment are extremely hard; in particular, the Vickers hardness of Fe-B-Si-P-C-Cu-based powder described above in an amorphous state at room temperature is approximately 800, and the Vickers hardness of the powder having been nanocrystallized exceeds 1000. Even when the powder made of such hard particles is green compacted, the resulting dust core has low density, and the magnetic properties cannot be improved sufficiently. To address this problem, studies have been made to provide a method of increasing the density of a nanocrystalline dust core made using amorphous powder as a material.

For example, JP H07-145442 A (PTL 4) discloses a method of manufacturing a high-density dust core by extruding Fe-B-based amorphous powder having been heated to a temperature near its softening point. The extrusion temperature in the above method is set to be 300° C. to 600° C.

Further, JP H08-337839 A (PTL 5) discloses a method of pressing and heating Fe-B-based amorphous powder similar to one in PTL 4, in which the density of the green compact is increased by setting the heating temperature to $T_x$−100° C. or higher and $T_x$+100° C. or lower where $T_x$ is the initial crystallization temperature of the amorphous powder. In the above method, the density of the green compact is described as being increased because the amorphous powder is softened in the above temperature range.

In addition, JP 4752641 B2 (PTL 6) discloses a method in which when metallic glass powder is sintered by pulsed electric current sintering, the pattern of pressing and heating is controlled, thereby preventing insulating layers applied to the surface of powder particles from breaking and increasing the density of the powder.

CITATION LIST

Patent Literature

PTL 1: JP 2004-349585 A

PTL 2: JP 2014-103265 A

PTL 3: JP 5537534 B2

PTL 4: JP H07-145442 A

PTL 5: JP H08-337839 A

PTL 6: JP 4752641 B2

SUMMARY

Technical Problem

However, even if the methods disclosed in PTLs 4 to 6 are used, it has been difficult to form Fe-B-Si-P-C-Cu-based amorphous powder having significantly high hardness as described above into a dense green compact without damaging the insulation coating applied to the surface of the powder particles and to prevent secondary phases of borides or the like which would affect the magnetic properties from being crystallized.

It could thus be helpful to provide a soft magnetic dust core having high density and favorable properties.

Solution to Problem

Specifically, primary features of the present disclosure are as follows.

1. A method of manufacturing a soft magnetic dust core comprising:

preparing coated powder including amorphous powder made of an Fe-B-Si-P-C-Cu-based alloy, an Fe-B-P-C-Cu-based alloy, an Fe-B-Si-P-Cu-based alloy, or an Fe-B-P-Cu-based alloy, with a first initial crystallization temperature $T_{x1}$ and a second initial crystallization temperature $T_{x2}$; and a coating formed on a surface of particles of the amorphous powder;

applying a compacting pressure to the coated powder or a mixture of the coated powder and the amorphous powder at a temperature equal to or lower than $T_{x1}-100$ K; and heating to a maximum end-point temperature equal to or higher than $T_{x1}-50$ K and lower than $T_{x2}$ with the compacting pressure being applied.

2. The method of manufacturing a soft magnetic dust core, according to 1. above, wherein the amorphous powder has a composition containing, in atomic percent:

Fe: 79% or more and 86% or less;
B: 4% or more and 13% or less;
Si: 0% or more and 8% or less;
P: 1% or more and 14% or less;
C: 0% or more and 5% or less;
Cu: 0.4% or more and 1.4% or less; and
incidental impurities.

3. The method of manufacturing a soft magnetic dust core, according to 2. above, wherein the composition contains total 3 at. % or less of at least one selected from the group consisting of Co, Ni, Ca, Mg, Ti, Zr, Hf, Nb, Ta, Mo, W, Cr, Al, Mn, Ag, Zn, Sn, As, Sb, Bi, Y, N, O, S, and rare earth elements, instead of part of Fe.

4. The method of manufacturing a soft magnetic dust core, according to any one of 1. to 3. above, wherein a mean particle diameter $D_{50}$ of the amorphous powder is 1 μm to 100 μm.

5. The method of manufacturing a soft magnetic dust core, according to any one of 1. to 4. above, wherein an apparent density AD ($Mg/m^3$) of the amorphous powder and the mean particle diameter $D_{50}$ (μm) satisfy $AD \geq 2.8+0.005 \times D_{50}$.

6. The method of manufacturing a soft magnetic dust core, according to any one of 1. to 5. above, wherein a crystallization degree of the amorphous powder is 20% or less.

7. The method of manufacturing a soft magnetic dust core, according to any one of 1. to 6. above, wherein crystalline soft magnetic powder is mixed with the amorphous powder or the coated powder.

8. The method of manufacturing a soft magnetic dust core, according to any one of 1. to 7. above, wherein the compacting pressure is 100 MPa to 2000 MPa, and a holding time is 120 minutes or less, the holding time being defined as a time after the heating to the maximum end-point temperature, during which the maximum end-point temperature is kept while the compacting pressure is applied.

9. The method of manufacturing a soft magnetic dust core, according to any one of 1. to 8. above, wherein the heating is performed by electrical heating.

10. The method of manufacturing a soft magnetic dust core, according to any one of 1. to 8. above, wherein the heating is performed using at least one heating source placed inside, outside, or both inside and outside a mold used for the application of the compacting pressure.

11. The method of manufacturing a soft magnetic dust core, according to any one of 1. to 8. above, wherein the heating is performed by both electrical heating, and heating using at least one heating source placed inside, outside, or both inside and outside a mold used for the application of the compacting pressure.

12. The method of manufacturing a soft magnetic dust core, according to any one of 1. to 11. above, wherein prior to the application of the compacting pressure, the amorphous powder is preformed at a filling rate of 70% or less.

13. A soft magnetic dust core manufactured by the method according to any one of 1. to 12. above, the soft magnetic dust core having a green density of 78% or more, a crystallization degree of 40% or more, and α-Fe crystallites with a size of 50 nm or less.

Advantageous Effect

According to this disclosure, a soft magnetic dust core having high density and favorable properties can be obtained.

BRIEF DESCRIPTION OF THE DRAWINGS

FIG. 1 is a flow diagram illustrating a method of manufacturing a soft magnetic dust core according to one embodiment of this disclosure.

DETAILED DESCRIPTION

FIG. 1 is a flow diagram illustrating a method of manufacturing a soft magnetic dust core according to one embodiment of this disclosure. In the embodiment illustrated by the flow diagram, first, the surface of particles of amorphous powder is coated to prepare coated powder to be a material. Next, the coated powder is subjected to pressing and heating processes, thereby obtaining a dust core as a formed body. In the pressing and heating processes, a compacting pressure is applied to the material under predetermined temperature conditions, and the heating is then performed to a predetermined maximum end-point temperature with the compacting pressure being applied. As illustrated in FIG. 1, crystalline magnetic powder having a smaller mean particle diameter than the amorphous powder can be added to the amorphous powder before being coated and the coated powder. Alternatively, the uncoated amorphous powder may be added to the coated powder and the powders can be subjected to the pressing and heating processes in the form of a mixture of the coated powder and the amorphous powder. The coated powder may be preformed before pressing and heating processes. Further, heat treatment can be performed on the dust core obtained through the pressing and heating processes. Materials and the steps that can be used in this disclosure will now be described in detail. In the description below, the symbol % used to express the composition denotes at. % unless otherwise specified.

<Coated Powder>

In the disclosed method of manufacturing a soft magnetic dust core, coated powder having amorphous powder and a coating formed on the surface of the particles of the amorphous powder is used as a material.

<Amorphous Powder>

The above amorphous powder used may be any given amorphous powder made of an Fe-B-Si-P-C-Cu-based alloy, an Fe-B-P-C-Cu-based alloy, an Fe-B-Si-P-Cu-based alloy, or an Fe-B-P-Cu-based alloy.

The amorphous powder used may be for example, the Fe-B-Si-P-C-Cu-based amorphous powder disclosed in PTL 3. The preferred content range of each component of the composition will be further described below.

A higher Fe content improves the saturation magnetic flux density. Accordingly, in terms of sufficiently improving the saturation magnetic flux density, the Fe content is preferably 79% or more. In particular, when a saturation magnetic flux density of 1.6 T or more is required, the Fe content is preferably 81% or more. On the other hand, when the Fe content is excessively high, a higher cooling rate is required in producing amorphous powder, which would make it difficult to produce amorphous powder having uniform particles. Therefore, the Fe content is preferably 86% or less. When more uniformity is sought, the Fe content is more preferably 85% or less. Further, in particular when the amorphous powder is produced by a method using a low cooling rate, such as gas atomization, the Fe content is yet more preferably 84% or less.

Si is an element which serves to form an amorphous phase. The lower limit of the Si content is not limited and may be 0%; however, adding Si can improve the stabilization of nanocrystals. When Si is added, the Si content is preferably 0.1% or more, more preferably 0.5% or more, and still more preferably 1% or more. On the other hand, an excessively high Si content reduces the glass forming ability and degrades soft magnetic properties. Accordingly, the Si content is preferably 8% or less, more preferably 6% or less, and still more preferably 5% or less.

B is an essential element which serves to form an amorphous phase. When the B content is too low, it would be difficult to form an amorphous phase under rapid liquid cooling conditions for example in water atomization. Accordingly, the B content is preferably 4% or more, more preferably 5% or more. On the other hand, an excessively high B content reduces the difference between $T_{x1}$ and $T_{x2}$, which makes it difficult to obtain a uniform nanocrystalline structure, in which case, the soft magnetic properties of the dust core would be degraded. Therefore, the B content is preferably 13% or less. In particular, when the alloy powder is required to have a low melting point for mass production, the B content is more preferably 10% or less.

P is an essential element which serves to form an amorphous phase. When the P content is too low, it would be difficult to form an amorphous phase under rapid liquid cooling conditions for example in water atomization. Accordingly, the P content is preferably 1% or more, more preferably 3% or more, and still more preferably 4% or more. On the other hand, an excessively high P content would reduce the saturated magnetic flux density and degrade the soft magnetic properties. Therefore, the P content is preferably 14% or less, more preferably 9% or less.

C is an element that serves to form an amorphous phase. The lower limit of the C content is not limited in particular and may be 0%. However, when C is used in combination with B, Si, P, and the like, the glass forming ability and the stabilization of the nanocrystals can be further increased compared with the case of using only one of those elements. When C is added, the C content is preferably 0.1% or more, more preferably 0.5% or more. On the other hand, an excessively high C content would make the alloy composition brittle and would degrade the soft magnetic properties. Therefore, the C content is preferably 5% or less. In particular, a C content of 2% or less can prevent variation of the composition due to the evaporation of C in melting.

Cu is an essential element that contributes to nanocrystalization. When the Cu content is excessively low, nanocrystallization would hardly occur. Therefore, the Cu content is preferably 0.4% or more, more preferably 0.5% or more. On the other hand, when the Cu content is excessively high, the amorphous phase becomes nonuniform, so that a nonuniform nanocrystal structure cannot be obtained through heat treatment and the soft magnetic properties would be degraded. Accordingly, the Cu content is preferably 1.4% or less, more preferably 1.2% or less, and still more preferably 0.8% or less. Considering the oxidation of the alloy powder and the grain growth of the alloy powder into nanocrystals in particular, the Cu content is preferably 0.5% or more and 0.8% or less.

Amorphous powder used in one embodiment of this disclosure is substantially composed of the above-described elements and incidental impurities. The incidental impurities may contain elements such as Mn, Al, and O, in which case, the total content of Mn, Al, and O is preferably 1.5% or less.

More preferably, the above amorphous powder used has a composition containing $79\% \le Fe \le 86\%$, $0\% \le Si \le 8\%$, $4\% \le B \le 13\%$, $1\% \le P \le 14\%$, $0\% \le C \le 5\%$, $0.4\% \le Cu \le 1.4\%$, and incidental impurities. Still more preferably, the amorphous powder has a composition containing $81\% \le Fe \le 85\%$, $0\% \le Si \le 6\%$, $4\% \le B \le 10\%$, $3\% \le P \le 9\%$, $0\% \le C \le 2\%$, $0.5\% \le Cu \le 0.8\%$, and incidental impurities. Most preferably, the amorphous powder has a composition containing $81\% \le Fe \le 84\%$, $0\% \le Si \le 5\%$, $4\% \le B \le 10\%$, $4\% \le P \le 9\%$, $0\% \le C \le 2\%$, $0.5\% \le Cu \le 0.8\%$, and incidental impurities.

Note that the above composition may contain other trace elements unless the operation and effect of this disclosure are adversely affected. In order to improve corrosion resistance and control electric resistance, provided that the saturated magnetic flux density does not excessively decrease, the composition of the amorphous powder may contain total 3 at. % or less of at least one selected from the group consisting of Co, Ni, Ca, Mg, Ti, Zr, Hf, Nb, Ta, Mo, W, Cr, Al, Mn, Ag, Zn, Sn, As, Sb, Bi, Y, N, O, S, and rare earth elements, instead of part of Fe.

In other words, the amorphous powder used may have a composition containing, in at. %:

Fe: 79% or more and 86% or less;
B: 4% or more and 13% or less;
Si: 0% or more and 8% or less;
P: 1% or more and 14% or less;
C: 0% or more and 5% or less;
Cu: 0.4% or more and 1.4% or less;
optionally at least one selected from the group consisting of Co, Ni, Ca, Mg, Ti, Zr, Hf, Nb, Ta, Mo, W, Cr, Al, Mn, Ag, Zn, Sn, As, Sb, Bi, Y, N, O, S, and rare earth elements: 3 at. % or less in total; and
incidental impurities.

Since Co, Ni, Ca, Mg, Ti, Zr, Hf, Nb, Ta, Mo, W, Cr, Al, Mn, Ag, Zn, Sn, As, Sb, Bi, Y, N, O, S, and rare earth elements above are optional additional elements, the lower limit of the total content of those elements may be 0%.

<Initial Crystallization Temperature>

The amorphous powder used in this disclosure has a first initial crystallization temperature $T_{x1}$ and a second initial crystallization temperature $T_{x2}$. In other words, the amorphous powder has at least two exothermic peaks indicating crystallizations in the heating stage in a differential scanning calorimetry (DSC) curve obtained by differential scanning calorimetry. Of the exothermic peaks, the exothermic peak on the lowest temperature side indicates a first crystallization in which an α-Fe phase is crystallized, and the next exothermic peak indicates a second crystallization in which a boride or the like is crystallized.

Here, the first initial crystallization temperature $T_{x1}$ is defined as the temperature of the intersection point of the base line of the DSC curve and a first rising tangent line that is a tangent line passing through a point having the largest positive slope in a first rising portion from the base line to the first peak that is the exothermic peak on the lowest temperature side. Further, the second initial crystallization temperature $T_{x2}$ is defined as the temperature of the intersection point of the base line and a second rising tangent line that is a tangent line passing through a point having the largest positive slope in a second rising portion from the base line to the second peak that is the exothermic peak following the first peak. A first final crystallization temperature $T_{z1}$ is defined as the temperature of the intersection point of the base line and a first falling tangent line that is a tangent line passing through a point having the largest negative slope in a first descending portion from the first peak to the base line.

The method of producing the amorphous powder used is not limited in particular. For example, the method can include melting materials of an alloy, having a predetermined composition, followed by powdering the melt by atomization. For a specific technique of the atomization, various methods can be used, for example, water atomization or gas atomization. Preferred examples of the technique used include water atomization as disclosed in EXAMPLES of PTL 3, atomization using the centrifugal force of a rotating disc as disclosed in JP 2013-55182 A, a combination of gas atomization and water cooling as disclosed in JP 4061783 B2 and JP 4181234 B2, and a method including water cooling after water atomization as disclosed in JP 2007-291454 A.

<Mean Particle Diameter $D_{50}$>

The mean particle diameter $D_{50}$ of the amorphous powder used herein is preferably in a range of 1 μm to 100 μm. Particles having $D_{50}$ of less than 1 μm are not readily industrially produced at low cost. Therefore, $D_{50}$ is preferably 1 μm or more, more preferably 3 μm or more, and still more preferably 5 μm or more. On the other hand, $D_{50}$ exceeding 100 μm can have a detrimental effect, for example, particle segregation. Accordingly, $D_{50}$ is preferably 100 μm or less, more preferably 90 μm or less, and still more preferably 80 μm or less. The mean particle diameter $D_{50}$ used herein refers to a particle diameter obtained when the volume-based integrated particle size distribution measured by laser diffraction or laser diffusion is 50%.

<Apparent Density AD>

The particle shape of the amorphous powder used herein is preferably as spherical as possible. When the particles are less spherical, projections would be formed on the surface of the particles, and the coating would be damaged by concentrated stress on the projections from the surrounding particles when a compacting pressure is applied, leading to insufficient insulation. As a result, the magnetic properties of the dust core to be obtained would be degraded (in particular, the iron loss would be increased). Accordingly, the apparent density AD which is an indication of the sphericity of the particles preferably satisfies $AD \geq 2.8+0.005 \times D_{50}$. Here, the unit of the AD is $Mg/m^3$, and the unit of $D_{50}$ is ||m. Further, the AD can be measured by a method defined in JIS Z 2504. Since a higher apparent density AD is preferred, the upper limit of the AD is not limited in particular; for example, the AD may be 5.00 $Mg/m^3$ or less and may be 4.50 $Mg/m^3$ or less.

The sphericity of the particles can be controlled to a preferable range by adjusting the conditions for producing the amorphous powder, for example, the amount of water, water pressure of a high pressure water jet used for atomization, the temperature of materials to be melted, and the feed rate of the materials in water atomization. Specific production conditions vary depending on the composition of the amorphous powder to be produced and the desired productivity.

The particle size distribution of the amorphous powder in this disclosure is not limited in particular; however, an excessively wide particle size distribution may have an adverse effect, for example, particle segregation. Therefore, the maximum particle diameter of the amorphous powder is preferably 2000 μm or less. Further, as described in A. B. Yu and N. Standish, "Characterisation of non-spherical particles from their packing behavior", Powder Technol. 74 (1993) 205-213, when amorphous powder having two peaks in the particle size distribution is used, the filling rate is improved, resulting in an improved density of a dust core. A particle size distribution having two peaks can be obtained for example by mixing powders having two particle diameters obtained by classification based on the particle diameters of the desired peaks. Given methods and apparatus can be used, for example, sieve classification or air classification can be employed for the classification; and hand mixing or machine blending using a V blender, a double cone blender, or the like can be employed for mixing. The probability of particle segregation can be reduced by attaching the powder particles with the smaller particle diameter to the surface of the powder particles with the larger particle diameter. In order to attach the powders, any given method can be used. For example, the adhesion force of the coating material itself may be used, or a binder may be added.

Further, crystal soft magnetic powder may be mixed with the amorphous powder or the coated powder. The magnetic powder that can be mixed is not limited in particular; for example, iron powder (pure iron powder), carbonyl iron powder, Sendust powder, Permendur powder, or Fe-Si-Cr-based soft magnetic powder can be used. The crystalline soft magnetic powder may be selected depending on the use of the nanocrystalline dust core to be manufactured. Particularly preferably, crystalline soft magnetic powder having smaller mean particle diameter than that of the amorphous powder is used. This makes voids between the amorphous powder particles being filled with the magnetic particles, thereby improving the density of the dust core, so that advantageous effects such as improvement of the saturation magnetic flux density can be achieved. The amount of the crystalline soft magnetic powder mixed is preferably 5 mass % or less of the total amount of the crystalline soft magnetic powder and one of the amorphous powder and the coated powder. Since the disclosed amorphous powder densification effect is not exerted on crystalline soft magnetic powder, the mixed amount exceeding 5 mass % rather reduces the density of the dust core.

<Crystallization Degree>

As the crystallization degree of the amorphous powder used herein is lower, a dust core to be manufactured is uniformly nanocrystallized, and exhibits favorable soft magnetic properties. Accordingly, the crystallization degree of the amorphous powder is preferably 20% or less, more preferably 10% or less, and still more preferably 3% or less. Here, the crystallization degree is a value calculated by the whole-powder-pattern decomposition (WPPD) method using an X-ray diffraction pattern. On the other hand, since the crystallization degree of the amorphous powder is preferably as low as possible, the lower limit of the crystallization degree is not limited. For example, the crystallization degree may be 0%.

<Coating>

A coating is applied to the above-described amorphous powder for example in order to improve insulation and mechanical strength. The material of the coating is not limited in particular, and any given material, an insulating material in particular can be used. A given material can be used as the material, for example, resins (silicone resin, epoxy resin, phenol resin, polyamide resin, polyimide resin, and the like), phosphates, borates, chromates, metal oxides (silica, alumina, magnesia, and the like), and inorganic polymers (polysilane, polygermane, polystannane, polysiloxane, polysilsesquioxane, polysilazane, polyborazylene, polyphosphazene, and the like) can be used depending on the desired insulation performance. Further, a plurality of materials may be used in parallel; for example, the coating may be formed to have a multi-layer structure with two or more layers using different materials. When amorphous powder having two peaks in the particle size distribution as described above is used, the above-described powders having two particle diameters may be mixed and then formed with only one of the powders having been subjected to insulation and without the other having been subjected to insulation coating.

The method of coating can be selected from various methods including powder mixing, dip coating, spray coating, fluidized bed coating, the sol-gel process, CVD, and PVD in view of the kind of the material used for coating and cost efficiency.

When the coating weight (coating coverage) of the coating is excessively high, the saturated magnetic flux density would be reduced. Therefore, the coating weight is preferably 15 parts by volume or less, more preferably 10 parts by volume or less, per 100 parts by volume of the amorphous powder. On the other hand, the lower limit of the coating weight is not limited in particular, yet if the coating weight is excessively low, the effects of the coating in improving insulation and strength might not be sufficiently achieved. Therefore, the coating weight is preferably 0.5 parts by volume or more, more preferably 1 part by volume or more, per 100 parts by volume of the amorphous powder.

<Preformation>

In this disclosure, before applying a compacting pressure to be described to the above coated powder, preformation can be performed. However, when the filling rate of the preformed body obtained by the preformation exceeds 70%, the coating would be partially damaged, so that sufficient insulating effects would not be obtained. Accordingly, when preformation is performed, the filling rate of the formed body after the preformation is preferably 70% or less. On the other hand, the lower limit of the filling rate is not limited in particular; however, when the filling rate is less than 30%, the strength of the preformed body would be reduced, and the preformed body would be broken while being handled in the subsequent steps. Therefore, the filling rate is preferably 30% or more. Note that the filling rate here is a ratio of the actual density with respect to the theoretical density determined in accordance with the composition. For the preformation, any given method used for example for the powder metallurgical technique, such as uniaxial pressing, isostatic pressing, or slip casting can be selected and used depending on the desired shape and cost efficiency. The preformation is preferably performed at a temperature lower than $T_{x1}$.

<Application of Compacting Pressure (Pressing)>

Next, a compacting pressure is applied to the coated powder obtained as described above under predetermined temperature conditions. The application of the compacting pressure can be performed by filling a mold with the coated powder and pressing in accordance with the conventional method. On that occasion, a higher compacting pressure has a larger densification effect. Accordingly, the compacting pressure is preferably 200 MPa or more, more preferably 300 MPa or more, still more preferably 500 MPa or more. On the other hand, an excessively high compacting pressure saturates the densification effect and increases the risk of mold damage. Accordingly, the compacting pressure is preferably 2000 MPa or less, more preferably 1500 MPa or less, and still more preferably 1300 MPa or less.

In this disclosure, it is important to apply the compacting pressure to the coated powder at a temperature of $T_{x1}-100$ K or less. Here, "applying a compacting pressure at a temperature of $T_{x1}-100$ K or less" means that the temperature of the coated powder at a time when the compacting pressure is applied is $T_{x1}-100$ K or less. In respect of this, the temperature of the coated powder before the application of the compacting pressure can be set to be $T_{x1}-100$ K or less. When the temperature exceeds $T_{x1}-100$ K, the density after the formation is not sufficiently improved. It is inferred that this is caused because if the temperature exceeds $T_{x1}-100$ K, partial crystallization starts, and particles start to be hardened due to the high crystallization rate. Meanwhile, the density of the Fe-B-based amorphous material of PTL 4 is improved by a method in which the amorphous material is heated to a temperature near the crystallization temperature and then pressed. Accordingly, a phenomenon in which a high-density dust core cannot be obtained unless the temperature of the material before being pressed is kept at $T_{x1}-100$ K or less is unique to the alloys used in this disclosure, and the phenomenon has been first revealed by the studies involving this disclosure. The phenomenon is attributed to a feature of the alloys used herein, that is, the alloys require a shorter time for crystallization than other alloys.

Further, since the temperature of the amorphous powder is $T_{x1}-100$ K or less at a time of applying a compacting pressure, the hardness of the amorphous powder is high at the start of the pressing. However, as stated above, when amorphous powder having a particle shape satisfying $AD \geq 2.8+0.005 \times D_{50}$ is used, the insulation coating on the particle surface can be prevented from being damaged even if pressing is performed in a state where the particles have high hardness. Thus, high resistance can be kept. Therefore, when amorphous powder satisfying $AD \geq 2.8+0.005 \times D_{50}$ is used, a formed body can be obtained which has higher density and extremely high resistance. The thus obtained formed body is more preferred as a dust core.

<Heating>

Next, the coated powder is heated to a maximum end-point temperature of $T_{x1}-50$ K or more and less than $T_{x2}$, with the compacting pressure being applied. Various methods can be used for the heating. Examples include but not limited to for example electrical heating (direct electrical heating, pulsed electrical heating, and the like), a method using a heat source such as an electrical heater, provided inside the mold, and a method of externally heating a mold placed in a heating chamber. When the temperature reaches $T_{x1}-50$ K, structure relaxation of the amorphous structure starts and the amorphous powder is softened, so that the density of the formed body is improved. When the temperature exceeds $T_{x1}$, a first crystallization starts and the particles are softened further, so that the density of the formed body is improved further. On the other hand, when the temperature is $T_{x2}$ or more, secondary phases of borides or the like are crystallized, resulting in degraded soft magnetic properties. Accordingly, the maximum end-point temperature here is set to be less than $T_{x2}$. The maximum end-point temperature is preferably $T_{x2}$−0.4ΔT K or less, where ΔT=$T_{x2}$−$T_{x1}$, more preferably $T_{x2}$−0.6ΔT K or less, still more preferably $T_{x2}$−0.8ΔT K or less.

In this disclosure, after heating to the maximum end-point temperature, the maximum end-point temperature can be held for a given period with the compacting pressure being applied. However, when the holding time is excessively long, for example, α-Fe crystal grains would be coarsened and secondary phases of borides or the like would be partly crystallized. Accordingly, the holding time is preferably 120 min or less, more preferably 100 min or less. On the other hand, the lower limit of the holding time is preferably, but not limited to, 1 min or more and more preferably 5 min or more.

<Heat Treatment>

In this disclosure, the dust core obtained by green compacting in the above-mentioned process may further be heat treated at a temperature in a range of $T_{x1}$ or more and $T_{x2}$ or less. The heat treatment further promotes nanocrystallization and allows the soft magnetic properties to be further improved.

<Soft Magnetic Dust Core>

In this disclosure, pressing and heating are performed under predetermined conditions as described above, thereby obtaining a soft magnetic dust core having a green density of 78% or more, a crystallization degree of 40% or more, and an α-Fe crystallite size of 50 nm or less. The green density is preferably 80% or more, more preferably 85% or more, and still more preferably 90% or more. On the other hand, the upper limit of the green density may be, but not limited to, 100% or 99% or less. The upper limit of the crystallization degree may typically be, but not limited to, 60% or less, 55% or less, or 50% or less. The α-Fe crystallite size is preferably 40 nm or less, more preferably 30 nm or less, and still more preferably 25 nm or less. On the other hand, the lower limit of the α-Fe crystallite size is not limited in particular. The size is preferably as small as possible, and may typically be 10 nm or more, or 15 nm or more.

The green density here is expressed as a percentage obtained by dividing the density calculated from the size and the weight of a dust core (formed body) by the true density of the coated powder determined based on the composition and the coating weight. Further, the α-Fe crystallite size is the crystallite diameter D (nm) calculated from a half width β of an X-ray diffraction peak corresponding to the α-Fe (110) plane using the Scherrer equation $D=0.9\lambda/\beta\cos\theta$. Here, λ is the wavelength (nm) of the X-ray, θ is the diffraction angle of the α-Fe (110) plane, and 2θ=52.505°. The crystallization degree of a soft magnetic dust core can be measured by the same method as the crystallization degree of the above-described amorphous powder.

EXAMPLES

Next, a more detailed description is given below based on Examples. The following examples merely present preferred examples, and this disclosure is not limited to those examples.

(Production of Amorphous Powder)

As feedstocks, electrolytic iron, ferrosilicon, ferrophosphorus, ferroboron, and electrolytic copper were weighed to achieve a predetermined ratio. Molten steel obtained by vacuum melting of the feedstocks was water atomized in an argon atmosphere, thereby producing an amorphous powder having a composition presented in Table 1. Amorphous powders Nos. 3-1 to 3-4 and Nos. 6-1 to 6-3 were produced using molten steel having the same composition; however, their mean particle diameter $D_{50}$ and apparent density AD is varied by adjusting the water atomization conditions and the conditions of classification after the atomization. The amorphous powder No. 3-4 was obtained by mixing two kinds of powders prepared by water atomization to achieve a weight ratio of 50:50. One of the powders had been separated by passing through a sieve of aperture size 53 μm, and the other had been classified by passing through a sieve of aperture size 106 μm and by remaining on a sieve of aperture size 75 μm. Accordingly, the amorphous powder No. 3-4 has a bimodal particle size distribution with two peaks. In a water atomizer system and a classifier system used in this example, the yield was extremely reduced when the mean particle diameter was intended to be adjusted to 1 μm or less, so that it was difficult to produce a sufficient amount of powder being green compacted to be evaluated.

Example 1

In order to determine the influence of the pressing and heating conditions, the same kind of coated powders were subjected to pressing and heating under various conditions, thereby evaluating the density and the crystal state of the resultant soft magnetic dust cores. The specific steps were as follows.

The amorphous powder No. 1 having a first initial crystallization temperature $T_{x1}$ of 454° C. and a second initial crystallization temperature $T_{x2}$ of 567° C. was used as an amorphous powder, and an insulation coating was formed on the surface of the amorphous powder particles. The insulation coating was prepared by immersing the amorphous powder in a solution in which a silicone resin (SR 2400 produced by Dow Corning Toray Co., Ltd.) was diluted with xylene and then volatilizing the xylene. The coating weight of the silicone resin was set to be 1 part by weight as a solid content of the silicone resin per 100 parts by weight of the amorphous powder. When converted to a volume fraction, the resin coating weight corresponds to approximately 6 parts by weight per 100 parts of weight of the amorphous powder.

The application of a compacting pressure and heating was performed on the coated powder obtained as described above according to the following steps. First, a cylindrical mold having an internal diameter of 15 mm was filled with the coated powder with a punch being inserted into the mold from the bottom; another punch was inserted into the mold from the top; and a pressing force of 1 GPa was applied thereto. Next, with the pressing force being applied, a direct current was flown using the upper and lower punches as electrodes, thereby raising the temperature at a rate of 10° C./min to a predetermined maximum end-point temperature. After the maximum end-point temperature was achieved, the temperature was held for a predetermined period, and a green compact was removed from the mold after cooling to the first initial crystallization temperature or lower. The temperature at a time of the compacting pressure application, the maximum end-point temperature, and the holding time of the maximum end-point temperature are presented in Table 2.

The green density, crystallization degree, and crystallite size of the resultant soft magnetic dust core were measured. The measurement results are presented in Table 2. Table 2 also presents whether secondary phases other than α-Fe were formed or not, which was determined by X-ray diffraction. Here, the green density was determined by dividing the density calculated from the size and weight of the soft magnetic dust core by the true density of the coated powder determined based on the composition and the coating weight.

Under each of the forming conditions Nos. 2 to 7, 9, 11, and 14 meeting the conditions of this disclosure, a green density of 78% or more and a crystallization degree of 40% or more was obtained. Further, in those examples, the crystallite size was 50 nm or less, and secondary phases were not formed or even when formed, the amount was very small. In contrast, under the forming condition No. 1 in which the end-point temperature was low, sufficient green density was not achieved and the crystallization degree was low. Under the forming condition No. 8, in which the maximum end-point temperature was high, secondary phases were significant. Under the forming condition No. 10 in which the temperature at a time of compacting pressure application was high, sufficient green density was not achieved. Under the forming condition No. 12 in which the holding time of the maximum end-point temperature was as long as 140 min, the crystallite size was large compared with the case where the holding time was 10 min, and secondary phases were slightly formed. Further, under the forming condition No. 13 in which the compacting pressure was as low as 80 MPa, the green density was low compared with the case where the compacting pressure was 1100 MPa.

TABLE 1

| Amorphous powder | Composition (at. %) | | | | | | Crystallization degree | First initial crystallization temperature | First final crystallization temperature | Second initial crystallization temperature | $D_{50}$ | Apparent density |
|---|---|---|---|---|---|---|---|---|---|---|---|---|
| No. | Fe | B | Si | P | Cu | C | (%) | (° C.) | (° C.) | (° C.) | (μm) | ($Mg/m^3$) |
| 1 | 80.3 | 10 | 5 | 4 | 0.7 | 0 | 1 | 454 | 471 | 567 | 45.3 | 3.25 |
| 2 | 81.3 | 9 | 5 | 4 | 0.7 | 0 | 2 | 440 | 466 | 565 | 46.8 | 3.41 |
| 3-1 | 81.4 | 10 | 0 | 8 | 0.6 | 0 | 3 | 436 | 454 | 509 | 50.2 | 3.37 |
| 3-2 | 81.4 | 10 | 0 | 8 | 0.6 | 0 | 3 | 436 | 454 | 509 | 19.8 | 2.91 |
| 3-3 | 81.4 | 10 | 0 | 8 | 0.6 | 0 | 3 | 436 | 454 | 509 | 48.2 | 2.85 |
| 3-4 * | 81.4 | 10 | 0 | 8 | 0.6 | 0 | 3 | 436 | 454 | 509 | 62.1 | 3.81 |
| 4 | 81.4 | 10 | 3 | 5 | 0.6 | 0 | 7 | 449 | 466 | 551 | 48.3 | 3.08 |
| 5 | 81.4 | 6 | 5 | 7 | 0.6 | 0 | 5 | 434 | 457 | 542 | 47.6 | 3.05 |
| 6-1 | 82.4 | 11 | 1 | 5 | 0.6 | 0 | 2 | 426 | 444 | 537 | 51.2 | 3.27 |
| 6-2 | 82.4 | 11 | 1 | 5 | 0.6 | 0 | 2 | 426 | 444 | 537 | 86.3 | 3.18 |
| 6-3 | 82.4 | 11 | 1 | 5 | 0.6 | 0 | 2 | 426 | 444 | 537 | 104.2 | 3.45 |
| 7 | 82.4 | 11 | 0 | 5 | 0.6 | 1 | 2 | 430 | 451 | 541 | 53.8 | 3.37 |
| 8 | 83.3 | 8 | 4 | 4 | 0.7 | 0 | 20 | 415 | 434 | 555 | 48.6 | 3.29 |
| 9 | 83.4 | 10 | 0 | 6 | 0.6 | 0 | 8 | 422 | 439 | 523 | 42.3 | 3.31 |
| 10 | 84.8 | 10 | 2 | 2 | 1.2 | 0 | 25 | 396 | 426 | 523 | 45.5 | 3.28 |
| 11 | 84.8 | 10 | 0 | 4.5 | 0.7 | 0 | 11 | 425 | 446 | 536 | 49.3 | 3.39 |
| 12 | 85.6 | 9.5 | 0 | 4.5 | 0.4 | 0 | 15 | 408 | 429 | 519 | 50.1 | 3.22 |
| 13 | 86.5 | 11 | 0 | 2 | 0.6 | 0 | 28 | 388 | 418 | 521 | 49.5 | 3.41 |

* The particle size distribution includes two peaks.

TABLE 2

| Forming condition No.* | Forming conditions: Temperature of compacting pressure application (° C.) | Compacting pressure (MPa) | Maximum end-point temperature (° C.) | Maximum end-point temperature holding time (min) | Dust core: Green density (%) | Crystallization degree (%) | α-Fe crystallite size (nm) | Secondary phase | Note |
|---|---|---|---|---|---|---|---|---|---|
| 1 | 25 | 1100 | 380 | 10 | 73 | 28 | 20 | Absent | Comparative Example |
| 2 | 25 | 1100 | 410 | 10 | 81 | 40 | 21 | Absent | Example |
| 3 | 25 | 1100 | 450 | 10 | 95 | 42 | 21 | Absent | Example |
| 4 | 25 | 1100 | 460 | 10 | 95 | 43 | 22 | Absent | Example |
| 5 | 25 | 1100 | 470 | 10 | 95 | 42 | 22 | Absent | Example |
| 6 | 25 | 1100 | 480 | 10 | 95 | 42 | 22 | Present (Slight) | Example |
| 7 | 25 | 1100 | 500 | 10 | 95 | 43 | 26 | Present (Slight) | Example |
| 8 | 25 | 1100 | 570 | 10 | 95 | 45 | 41 | Present (Significant) | Comparative Example |
| 8-1 | 25 | 1100 | 650 | 10 | 95 | 46 | 53 | Present (Significant) | Comparative Example |
| 9 | 250 | 1100 | 460 | 10 | 92 | 42 | 21 | Absent | Example |
| 10 | 410 | 1100 | 460 | 10 | 72 | 42 | 22 | Absent | Comparative Example |
| 11 | 25 | 1100 | 460 | 100 | 98 | 44 | 40 | Absent | Example |
| 12 | 25 | 1100 | 460 | 140 | 98 | 44 | 38 | Present (Slight) | Example |
| 13 | 25 | 80 | 450 | 10 | 78 | 41 | 21 | Absent | Example |
| 14 | 25 | 150 | 450 | 10 | 83 | 42 | 22 | Absent | Example |

*The amorphous powder No. 1 in Table 1 is used in each example.

Example 2

Next, in order to determine the influence of the amorphous powder to be used, the amorphous powders Nos. 1 to 13 presented in Table 1 was subjected to pressing and heating under the same conditions, thereby evaluating the density and the like of the resultant soft magnetic dust cores. The specific steps were as follows.

An insulation coating made of a silicone resin is formed on each of the amorphous powders Nos. 1 to 13 presented in Table 1 under the same conditions as Example 1, thereby obtaining coated powders. Next, the resulting coated powders were molded in the same manner as Example 1 except that the forming conditions were fixed to the condition No. 3 in Table 2, thereby manufacturing soft magnetic dust cores. The green density, the crystallite size, and the specific resistance of the soft magnetic dust cores were measured. The measurement results are presented in Table 3. Here, the green density was determined by the above-described method. Further, the specific resistance was measured by four-terminal sensing.

As seen from the results presented in Table 3, when pressing and heating is performed by a method meeting the conditions of this disclosure, a green density of 78% or more, a crystallization degree of 40% or more, and a crystallite size of 50 nm or less were achieved when any one of the amorphous powders was used.

For Samples Nos. 1 to 4 and 6 to 18 using amorphous powders in which the apparent density AD (Mg/m$^3$) and the mean particle diameter $D_{50}$ (μm) satisfy AD≥2.8+0.005×$D_{50}$, a sufficiently high specific resistance of 1000 μΩm or more was achieved. Presumably, this is because high sphericity of the amorphous powders might have prevented the insulating coating from being damaged by the projections formed on the surface of the particles. Further, for Sample No. 6 using the amorphous powder No. 3-4, a higher green density was achieved compared with the other cases. Presumably, this is because the amorphous powder No. 3-4 had a bimodal particle size distribution leading to increased filling rate. For Sample No. 11 using the amorphous powder No. 6-3, the green density varied significantly. Presumably, this is because the mean particle diameter $D_{50}$ of the amorphous powder No. 6-3 exceeding 100 μm might have caused particle segregation. Further, for Samples Nos. 15 and 18 using the amorphous powders No. 10 and No. 13, the green density was lower than in the other cases. Presumably, this is because the crystallization degree of the amorphous powders prior to molding exceeding 20% could not have sufficiently caused the softening phenomenon induced by structure relaxation of the amorphous structure or crystallization.

For Samples No. 6 and No. 6-1, the amorphous powder No. 3-4 having a bimodal particle size distribution was used. Note that for Sample No. 6, an insulation coating was applied to all the amorphous powder particles in the same manner as Example 1, whereas in Sample No. 6-1, an insulation coating was applied to the powder classified between the sieves having apertures of 106 μm and 75 μm in the same manner as Example 1, and no insulation coating was applied to the powder separated using a sieve having an aperture of 53 μm. The same conditions were used for Samples No. 6 and No. 6-1 other than the above respects. As a result, the specific resistance of the dust core of Sample No. 6-1 was close to 1000 μΩm although it was slightly lower than the specific resistance of Sample No. 6.

For Samples No. 1-1 to No. 1-3 in Table 3, dust cores were manufactured under the same conditions as Sample No. 1 except that carbonyl iron powder having a mean particle diameter of approximately 1 μm was mixed with the amorphous powder No. 1. Carbonyl iron powder is an iron powder (pure iron powder) obtained by the thermal decomposition of pentacarbonyliron (iron pentacarbonyl). The amount of the carbonyl iron powder added was 2 mass % (No. 1-1), 4 mass % (No. 1-2), and 6 mass % (No. 1-3) of the total mass of the amorphous powder No. 1 and the carbonyl iron powder. The green density of Samples Nos. 1-1 and 1-2 were higher than that of Sample No. 1, whereas the green density of Sample No. 1-3 was lower than that of Sample No. 1.

TABLE 3

| | | Dust core | | | | |
|---|---|---|---|---|---|---|
| No. *[1] | Amorphous powder No. | Green density (%) | Crystallization degree (%) | α-Fe crystallite size (nm) | Specific resistance (μΩm) | Note |
| 1 | 1 | 95 | 42 | 21 | ≥1000 | |
| 1-1 | 1 | 98 | 42 | 21 | ≥1000 | Carbonyl iron powder mixed: 2 mass % |
| 1-2 | 1 | 96 | 42 | 21 | ≥1000 | Carbonyl iron powder mixed: 4 mass % |
| 1-3 | 1 | 92 | 42 | 21 | ≥1000 | Carbonyl iron powder mixed: 6 mass % |
| 2 | 2 | 96 | 43 | 19 | ≥1000 | |
| 3 | 3-1 | 96 | 44 | 22 | ≥1000 | |
| 4 | 3-2 | 91 | 44 | 21 | ≥1000 | |
| 5 | 3-3 | 89 | 45 | 23 | 807 | |
| 6 | 3-4 | 98 | 44 | 22 | ≥1000 | |
| 6-1 | 3-4 | 98 | 44 | 22 | 975 | |
| 7 | 4 | 91 | 42 | 26 | ≥1000 | |
| 8 | 5 | 92 | 45 | 23 | ≥1000 | |
| 9 | 6-1 | 96 | 47 | 22 | ≥1000 | |
| 10 | 6-2 | 97 | 46 | 21 | ≥1000 | |
| 11 | 6-3 | 95 *[2] | 47 | 24 | ≥1000 | |
| 12 | 7 | 96 | 45 | 21 | ≥1000 | |
| 13 | 8 | 82 | 46 | 37 | ≥1000 | |
| 14 | 9 | 93 | 44 | 26 | ≥1000 | |
| 15 | 10 | 80 | 43 | 38 | ≥1000 | |
| 16 | 11 | 87 | 44 | 31 | ≥1000 | |
| 17 | 12 | 85 | 43 | 35 | ≥1000 | |
| 18 | 13 | 80 | 40 | 40 | ≥1000 | |

*[1] The forming conditions of each example are the same as those of No. 3 in Table 2.

*[2] The value varies between 92% to 98%.

The invention claimed is:

1. A method of manufacturing a soft magnetic dust core comprising:

preparing coated powder including amorphous powder made of an Fe-B-Si-P-C-Cu-based alloy, an Fe-B-P-C-Cu-based alloy, an Fe-B-Si-P-Cu-based alloy, or an Fe-B-P-Cu-based alloy, with a first initial crystallization temperature $T_{x1}$ and a second initial crystallization temperature $T_{x2}$; and a coating formed on a surface of particles of the amorphous powder;

applying a compacting pressure to the coated powder or a mixture of the coated powder and the amorphous powder at a temperature equal to or lower than $T_{x1}-100$ K;

heating to a maximum end-point temperature equal to or higher than $T_{x1}-50$ K and lower than $T_{x2}$ with the compacting pressure being applied; and thereby producing a soft magnetic dust core having a green density of 78% or more, a crystallization degree of 40% or more, and α-Fe crystallites with a size of 50 nm or less.

2. The method of manufacturing a soft magnetic dust core, according to claim 1, wherein the amorphous powder has a composition containing, in atomic percent:

Fe: 79% or more and 86% or less;

B: 4% or more and 13% or less;

Si: 0% or more and 8% or less;

P: 1% or more and 14% or less;

C: 0% or more and 5% or less;

Cu: 0.4% or more and 1.4% or less; and incidental impurities.

3. The method of manufacturing a soft magnetic dust core, according to claim 2, wherein the composition contains total 3 at. % or less of at least one selected from the group consisting of Co, Ni, Ca, Mg, Ti, Zr, Hf, Nb, Ta, Mo, W, Cr, Al, Mn, Ag, Zn, Sn, As, Sb, Bi, Y, N, O, S, and rare earth elements, instead of part of Fe.

4. The method of manufacturing a soft magnetic dust core, according to claim 1, wherein a mean particle diameter $D_{50}$ of the amorphous powder is 1 μm to 100 μm.

5. The method of manufacturing a soft magnetic dust core, according to claim 2, wherein a mean particle diameter $D_{50}$ of the amorphous powder is 1 μm to 100 μm.

6. The method of manufacturing a soft magnetic dust core, according to claim 1, wherein an apparent density AD ($Mg/m^3$) of the amorphous powder and the mean particle diameter $D_{50}$ (μm) satisfy $AD \geq 2.8+0.005 \times D_{50}$.

7. The method of manufacturing a soft magnetic dust core, according to claim 2, wherein an apparent density AD ($Mg/m^3$) of the amorphous powder and the mean particle diameter $D_{50}$ (μm) satisfy $AD \geq 2.8+0.005 \times D_{50}$.

8. The method of manufacturing a soft magnetic dust core, according to claim 1, wherein a crystallization degree of the amorphous powder is 20% or less.

9. The method of manufacturing a soft magnetic dust core, according to claim 2, wherein a crystallization degree of the amorphous powder is 20% or less.

10. The method of manufacturing a soft magnetic dust core, according to claim 1, wherein crystalline soft magnetic powder is mixed with the amorphous powder or the coated powder.

11. The method of manufacturing a soft magnetic dust core, according to claim 2, wherein crystalline soft magnetic powder is mixed with the amorphous powder or the coated powder.

12. The method of manufacturing a soft magnetic dust core, according to claim 1, wherein the compacting pressure is 100 MPa to 2000 MPa, and a holding time is 120 minutes or less, the holding time being defined as a time after the heating to the maximum end-point temperature, during which the maximum end-point temperature is kept while the compacting pressure is applied.

13. The method of manufacturing a soft magnetic dust core, according to claim 2, wherein the compacting pressure is 100 MPa to 2000 MPa, and a holding time is 120 minutes or less, the holding time being defined as a time after the heating to the maximum end-point temperature, during which the maximum end-point temperature is kept while the compacting pressure is applied.

14. The method of manufacturing a soft magnetic dust core, according to claim 1, wherein the heating is performed by electrical heating.

15. The method of manufacturing a soft magnetic dust core, according to claim 2, wherein the heating is performed by electrical heating.

16. The method of manufacturing a soft magnetic dust core, according to claim 1, wherein the heating is performed using at least one heating source placed inside, outside, or both inside and outside a mold used for the application of the compacting pressure.

17. The method of manufacturing a soft magnetic dust core, according to claim 1, wherein the heating is performed by both electrical heating, and heating using at least one heating source placed inside, outside, or both inside and outside a mold used for the application of the compacting pressure.

18. The method of manufacturing a soft magnetic dust core, according to claim 1, wherein prior to the application of the compacting pressure, the amorphous powder is preformed at a filling rate of 70% or less.

* * * * *